United States Patent
Wang (10) Patent No.: US 12,219,658 B2
(45) Date of Patent: Feb. 4, 2025

(54) METHOD FOR CONTROLLING TERMINAL, AND ELECTRONIC DEVICE

(71) Applicant: BEIJING XIAOMI MOBILE SOFTWARE CO., LTD., Beijing (CN)

(72) Inventor: Jiao Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 378 days.

(21) Appl. No.: 17/679,956

(22) Filed: Feb. 24, 2022

(65) Prior Publication Data

US 2023/0038326 A1    Feb. 9, 2023

(30) Foreign Application Priority Data

Aug. 5, 2021 (CN) .......................... 202110896148.8

(51) Int. Cl.
*H04W 8/00* (2009.01)
*H04W 8/18* (2009.01)
*H04W 8/24* (2009.01)
*H04W 12/42* (2021.01)

(52) U.S. Cl.
CPC ............. *H04W 8/183* (2013.01); *H04W 8/24* (2013.01); *H04W 12/42* (2021.01)

(58) Field of Classification Search
CPC ........ H04W 8/183; H04W 12/42; H04W 8/24
See application file for complete search history.

(56) References Cited

U.S. PATENT DOCUMENTS

| | | | |
|---|---|---|---|
| 9,639,692 B1 * | 5/2017 | Xue | H04W 12/126 |
| 10,939,500 B1 * | 3/2021 | Kiraly | H04W 68/00 |
| 2010/0151884 A1 * | 6/2010 | Chang | H04W 4/20 |
| | | | 455/456.2 |
| 2010/0273452 A1 * | 10/2010 | Rajann | H04W 12/30 |
| | | | 455/456.2 |
| 2014/0325689 A1 * | 10/2014 | Ye | G06F 21/88 |
| | | | 726/35 |
| 2016/0381552 A1 * | 12/2016 | Jakobsson | H04W 12/06 |
| | | | 455/411 |
| 2020/0260287 A1 * | 8/2020 | Hendel | G06N 5/04 |
| 2021/0037389 A1 * | 2/2021 | Mbonye | H04W 12/06 |

(Continued)

FOREIGN PATENT DOCUMENTS

| | | | |
|---|---|---|---|
| CN | 105491232 A | * | 4/2016 |
| CN | 107194291 A | | 9/2017 |
| EP | 3200116 A1 | | 8/2017 |

OTHER PUBLICATIONS

Chinese Patent Application No. 202110896148.8, English translation of Office Action dated Nov. 13, 2023, 6 pages.

(Continued)

*Primary Examiner* — Erika A Washington
(74) *Attorney, Agent, or Firm* — Cozen O'Connor (57) ABSTRACT

A method for controlling includes activating a virtual subscriber identity module (SIM) card in a terminal such as a mobile phone in response to determining that the terminal is in a lost state; receiving a control instruction through the virtual SIM card; and controlling the terminal based on the control instruction. A mobile phone or an electronic device incorporating the method and a non-transitory computer readable storage medium are also described.

18 Claims, 9 Drawing Sheets

(56) References Cited

U.S. PATENT DOCUMENTS

2022/0256308 A1* 8/2022 Volkerink ............. H04W 4/021

OTHER PUBLICATIONS

European Patent Application No. 22158828.8 Search and Opinion dated Jun. 13, 2022, 8 pages.
Chinese Patent Application No. 202110896148.8, Office Action dated Apr. 24, 2024, 7 pages.
Chinese Patent Application No. 202110896148.8, English translation of Office Action dated Apr. 24, 2024, 8 pages.

* cited by examiner

METHOD FOR CONTROLLING TERMINAL, AND ELECTRONIC DEVICE

CROSS REFERENCE TO RELATED APPLICATIONS

This application claims priority to Chinese Patent Application No. 202110896148.8, filed on Aug. 5, 2021, the entire content of which is incorporated herein by reference.

TECHNICAL FIELD

The disclosure relates to a field of terminal technologies, and particularly to a method and an apparatus for controlling a terminal, an electronic device and a computer readable storage medium.

BACKGROUND

When a mobile phone is lost or stolen, an unscrupulous person may attempt to illegally use the mobile phone. This may be done by removing a subscriber identity module (SIM) card from the mobile phone. Removal of the SIM card disconnects the mobile phone from the cellular network. This prevents the mobile phone from being traced and located, thus preventing the owner from retrieving the mobile phone.

SUMMARY

According to a first aspect of the disclosure, a method for controlling a terminal is provided, and includes: activating a virtual subscriber identity module (SIM) card in the terminal in response to determining that the terminal is in a lost state; receiving a control instruction through the virtual SIM card; and controlling the terminal based on the control instruction.

According to a second aspect of the disclosure, an electronic device is provided. The electronic device includes a processor and a memory configured to store instructions executable by the processor. The processor is configured to activate a virtual subscriber identity module (SIM) card in the terminal in response to determining that the terminal is in a lost state; receive a control instruction through the virtual SIM card; and control the terminal based on the control instruction.

According to a third aspect of the disclosure, a non-transitory computer readable storage medium stored with a computer program thereon is provided, when the computer program is executed by a processor, the method of the first aspect is carried out.

It should be understood that, the above general descriptions and detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The embodiments will be described in detail here, examples of which are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are merely examples of the apparatus and method consistent with some aspects of the present disclosure as detailed in the following claims.

Figure 1:
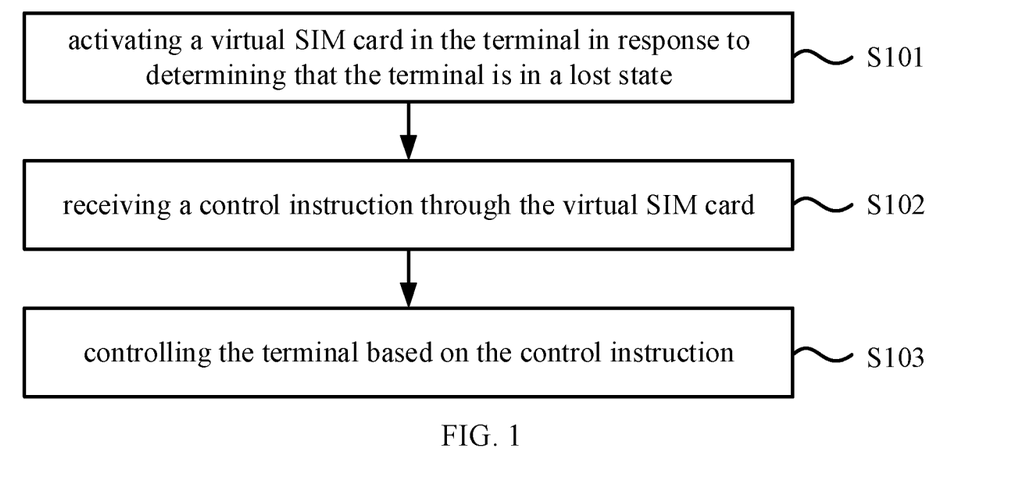
FIG. 1 is a flowchart illustrating a method for controlling a terminal in the embodiment of the disclosure.

FIG. 1 is a flowchart illustrating a method for controlling a terminal in the embodiment of the disclosure. The method may be applied to a terminal, and the terminal may be provided with a SIM card, including but not limited to an electronic device such as a mobile phone, a tablet, a wearable device and a personal computer.

As illustrated in FIG. 1, the method for controlling a terminal includes: at S101, a virtual SIM card in the terminal is activated in response to determining that the terminal is in a lost state; at S102, a control instruction is received through the virtual SIM card; and at S103, the terminal is controlled based on the control instruction.

In an embodiment, when the terminal satisfies certain conditions, it may be determined that the terminal itself is in the lost state. The specific conditions may be set as needed, which will not be described here, and will be exemplarily illustrated in several embodiments.

In an embodiment, a terminal may be provided with a virtual SIM card, and when the terminal determines that the terminal itself is in the lost state, the virtual SIM card may be activated. The virtual SIM card is different from a physical SIM card. The physical SIM card may be a SIM card inserted into a terminal and pulled out from the terminal. The function codes of the virtual SIM card in the embodiment may be written in the hardware of the terminal.

In an embodiment, the data of the virtual SIM card may be stored in a bottom layer of the terminal, and storing and reading the data of the virtual SIM card may be supported by the bottom layer of the terminal. Accordingly, the data of the virtual SIM card may not be swiped (deleted) by means of recovery. For example, the storage function of the data of the virtual SIM card is supported by IMTService#external_key_load provided by the bottom layer, and the reading function of the data of the virtual SIM card is supported by IVSIMService#sim_get (imsi) provided by the bottom layer. The international mobile subscriber identification number (IMSI) in the data of the virtual SIM card may be stored in the bottom layer of the terminal by adjusting a storage partition.

It should be noted that, the data of the virtual SIM card includes but not limited to the above IMSI, for example, may further include a card password, a card number, etc. Other devices may communicate with the virtual SIM card based on the card data of the virtual card, for example, send the control instruction to the virtual SIM card.

In the embodiments of the disclosure, a terminal may activate a virtual SIM card in the terminal in response to determining that the terminal is in a lost state. Since a virtual SIM card is not a physical SIM card, even if the physical SIM card is pulled out, the terminal still may receive a control instruction by the virtual SIM card, so that when the terminal is lost, the owner may continue sending the control instruction to the terminal so that the terminal is controlled to execute the corresponding operation for finding back the terminal.

The following describes how the terminal determines the terminal itself is in the lost state in several embodiments, and in specific applications, the manner in which the terminal determines the terminal itself is in the lost state includes but not limited to the case described in the following embodiments.

Figure 2:
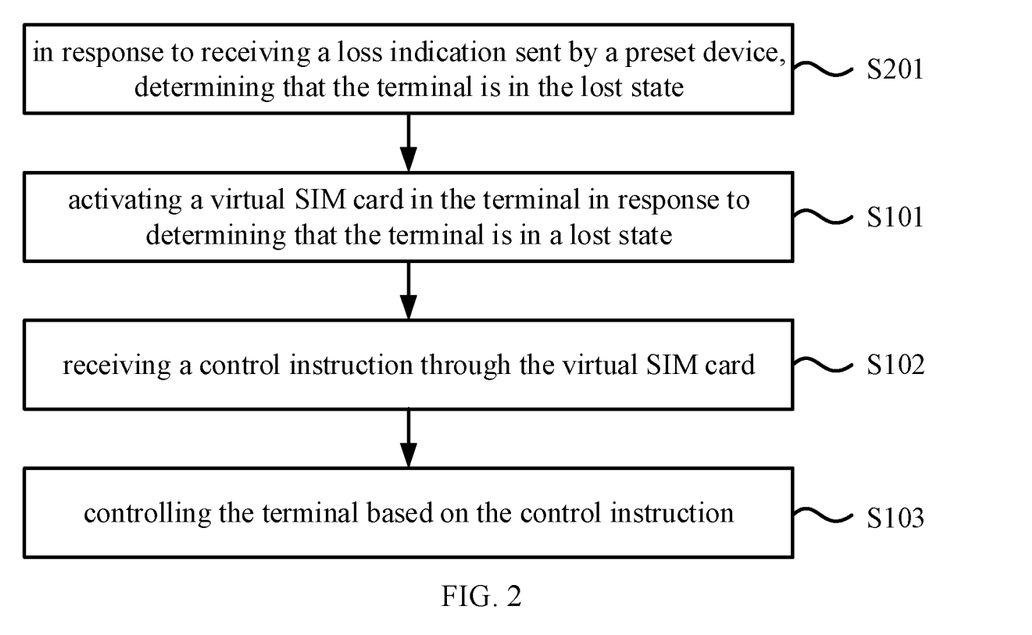
FIG. 2 is a flowchart illustrating another method for controlling a terminal in the embodiment of the disclosure.

FIG. 2 is a flowchart illustrating another method for controlling a terminal in the embodiment of the disclosure. As illustrated in FIG. 2, the method further includes: at S201, in response to receiving a loss indication sent by a preset device, it is determined that the terminal is in the lost state.

In an embodiment, after finding the terminal lost, the owner may log in a preset device through a browser of another mobile phone or computer, and then send a loss indication to the terminal through the preset device, in which the preset device includes but not limited to an electronic device other than a server, a virtual machine, and the terminal.

For example, the preset device may determine data of the virtual SIM card in the terminal lost by the user based on the identity of the login user, and the preset device may communicate with a network side device (for example, a base station and a core network) in a mobile network, and then send the loss indication and the data of the virtual SIM card to the network side device, and the network side device may determine a virtual SIM card based on the data of the virtual SIM card, and further communicate with the virtual SIM card to send the loss indication to the virtual SIM card. When the terminal receives the loss indication through the virtual SIM card, it may be determined that the terminal itself is in the lost state.

Figure 3:
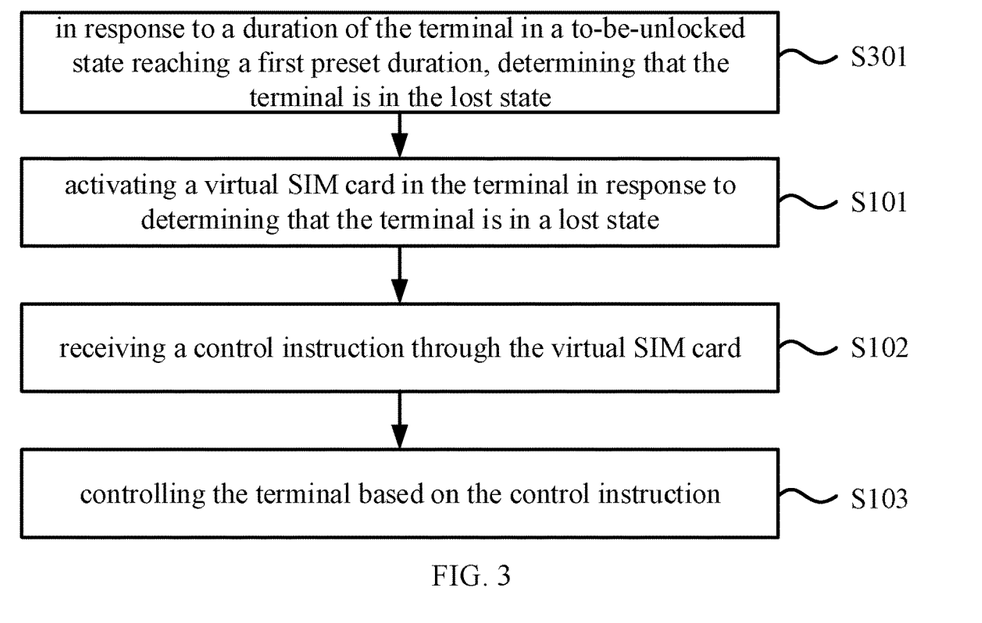
FIG. 3 is a flowchart illustrating yet another method for controlling a terminal in the embodiment of the disclosure.

FIG. 3 is a flowchart illustrating yet another method for controlling a terminal in the embodiment of the disclosure. As illustrated in FIG. 3, the method further includes: at S301, in response to a duration of the terminal in a to-be-unlocked state reaching a first preset duration, it is determined that the terminal is in the lost state.

In an embodiment, since those who attempt to illegally occupy a terminal generally do not know information of unlocking the terminal, such as a password, a fingerprint, and generally try to perform an unlocking operation on the terminal, however, in most cases, the password of the terminal may not be successfully guessed to unlock the terminal.

According to the embodiment, when the terminal enters the to-be-unlocked state, the terminal may record a duration of the terminal in the to-be-unlocked state, and since those who attempt to illegally occupy the terminal do not know a password of unlocking the terminal, the terminal may keep in the to-be-unlocked state for a long time in case that the terminal is lost. Therefore, when the recorded duration reaches a first preset duration, it may be determined that the terminal is in the lost state.

Figure 4A:
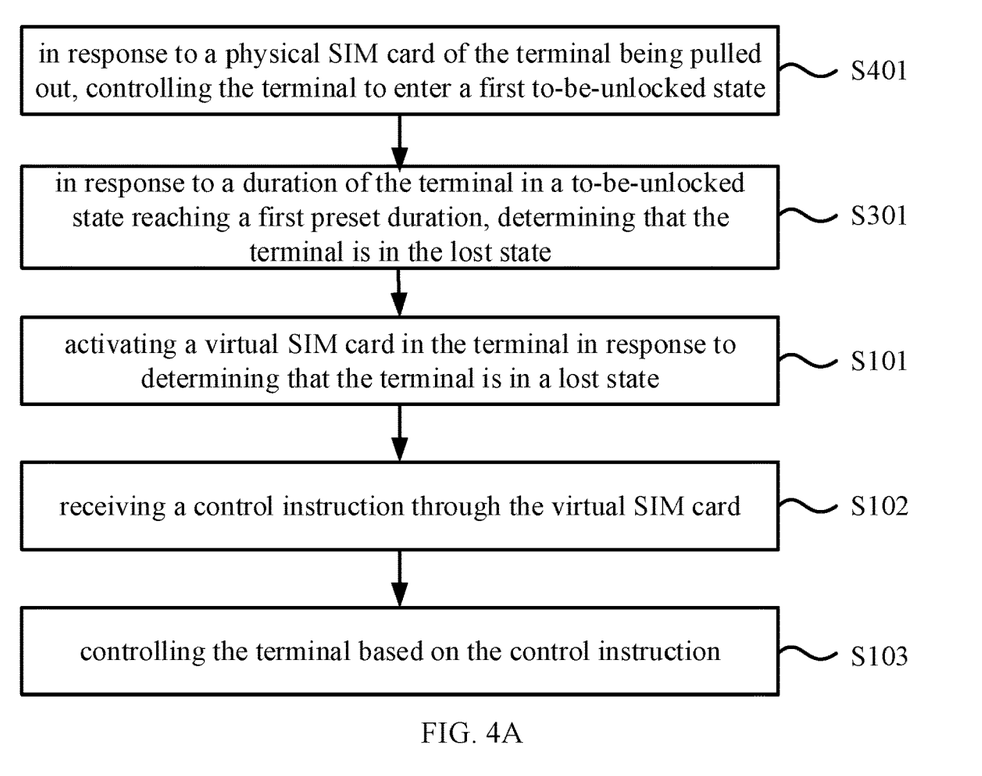
FIG. 4A is a flowchart illustrating yet another method for controlling a terminal in the embodiment of the disclosure.

FIG. 4A is a flowchart illustrating yet another method for controlling a terminal in the embodiment of the disclosure. As illustrated in FIG. 4A, the method further includes: at S401, in response to a physical SIM card of the terminal being pulled out, the terminal is controlled to enter a first to-be-unlocked state.

In an embodiment, those who illegally occupy a terminal generally pull out a physical SIM card in the terminal in order to prevent the owner from continuing to control the terminal through the physical SIM card in the terminal.

According to the embodiment, when the physical SIM card in the terminal is pulled out, the terminal may be controlled to enter a first to-be-unlocked state, the unlocking information including but not limited to a fingerprint, a password, a voice, etc.

Figure 4B:
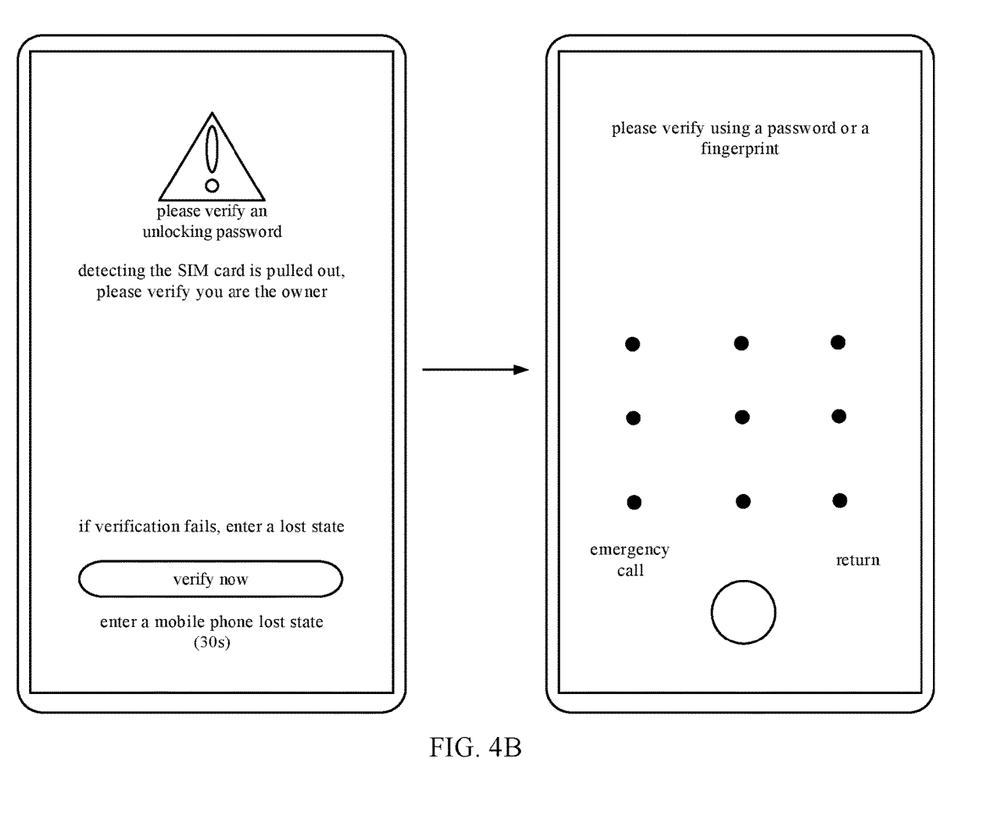
FIG. 4B is a diagram illustrating a first to-be-unlocked state in the embodiment of the disclosure.

FIG. 4B is a diagram illustrating a first to-be-unlocked state in the embodiment of the disclosure. As illustrated in FIG. 4B, after the first to-be-unlocked state is entered, information such as a verification key and a verification prompt may be displayed, and countdown time also may be displayed, and if the terminal still fails to be unlocked when the countdown time ends, it may be determined that the terminal is in the lost state. After clicking the verification key, a verification interface may be entered, and verification may be performed by inputting a password, a fingerprint, or the like.

In addition, when the countdown ends, a warning operation may be further performed, for example, the terminal generates a strong vibration, and the terminal periodically sends a warning sound, for example, "the SIM card has been pulled out, please verify a mobile password". The warning sound may be output with the maximum volume, so that the owner accurately finds the position of the terminal based on the warning sound.

Further, after successfully unlocking the terminal or inserting the SIM card into the terminal, the warning operation may be stopped. When it is detected that the inserted SIM card is different from the SIM card pulled out, the terminal may be maintained in the to-be-unlocked state.

Figure 5A:
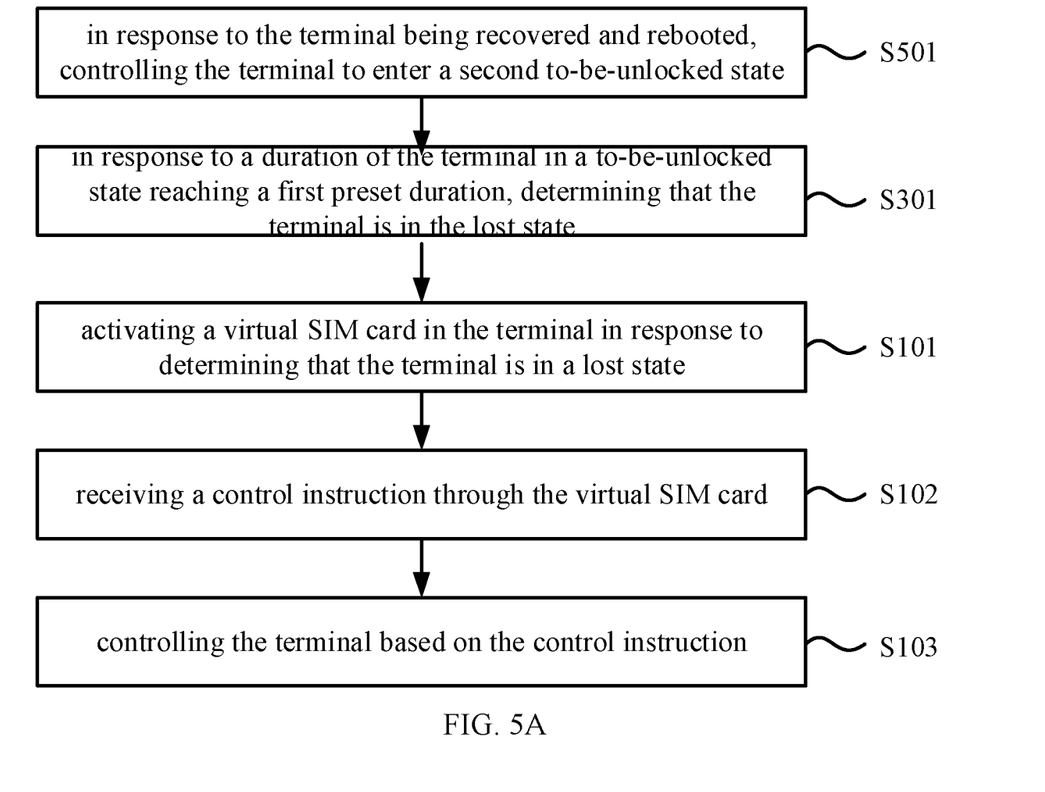
FIG. 5A is a flowchart illustrating yet another method for controlling a terminal in the embodiment of the disclosure.

FIG. 5A is a flowchart illustrating yet another method for controlling a terminal in the embodiment of the disclosure. As illustrated in FIG. 5A, the method further includes: at S501, in response to the terminal being recovered and rebooted, the terminal is controlled to enter a second to-be-unlocked state.

In an embodiment, those who attempt to illegally occupy the terminal generally clear the data in the terminal by means of recovery in order to use the terminal.

Figure 5B:
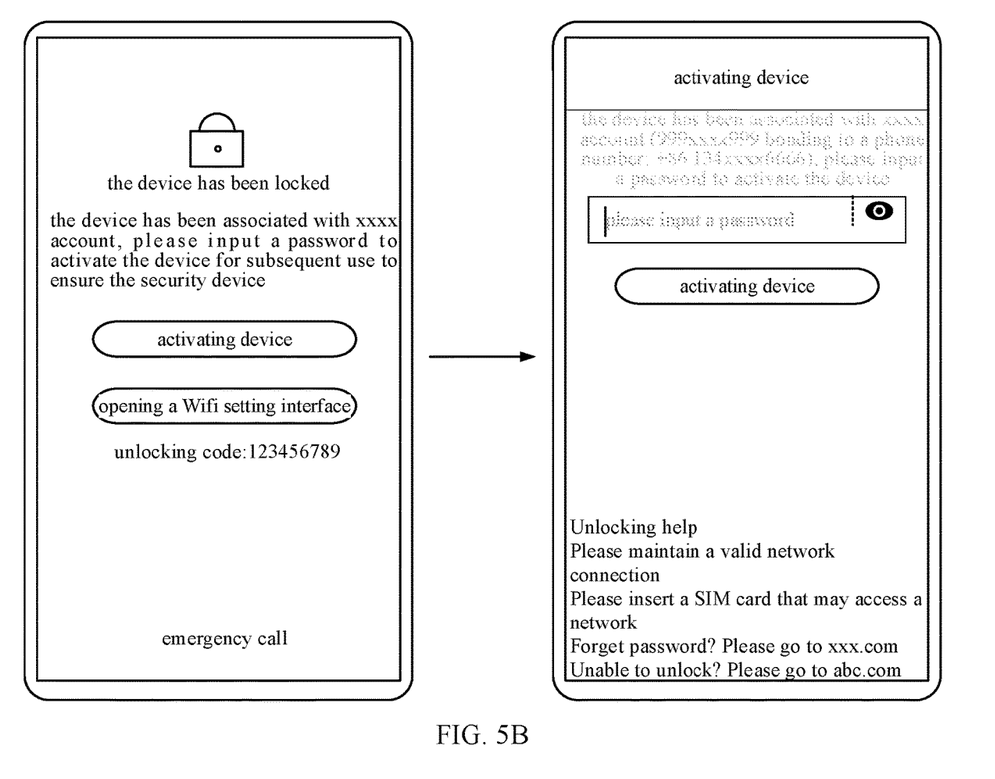
FIG. 5B is a diagram illustrating a second to-be-unlocked state in the embodiment of the disclosure.

FIG. 5B is a diagram illustrating a second to-be-unlocked state in the embodiment of the disclosure. As illustrated in FIG. 5B, in response to the terminal being recovered and rebooted, the terminal may be controlled to enter the second to-be-unlocked state. An activation (unlocking) key may be displayed, and after the activation key is clicked, an interface of inputting a password may be entered, the unlocking information including not limited to a password stored in the bottom layer of the terminal, and the password in the bottom layer may not be deleted due to recovery, which may be registered and obtained by the owner of the terminal on the server in advance.

The information such as a fingerprint, a password and a voice of the user may also be stored in the bottom layer of the terminal as unlocking information to serve as unlocking information of the second to-be-unlocked state. As illustrated in FIG. 5B, during the unlocking process, unlocking help information may also be displayed, so that the owner of the terminal may easily query an operation mode in case of forgetting how to operate when performing the operation.

Further, after the second to-be-unlocked state is entered, the countdown time may be displayed, and when the terminal fails to be unlocked when the countdown time ends, it may be determined that the terminal is in the lost state.

In addition, when the countdown ends, a warning operation may be further performed, for example, the terminal generates a strong vibration, and the terminal periodically sends a warning sound, for example, "the SIM card has been pulled out, please verify a mobile password". The warning sound may be output with the maximum volume, so that the owner accurately finds the position of the terminal based on the warning sound. After successfully unlocking the terminal or inserting the SIM card into the terminal, the warning operation may be stopped.

Figure 6:
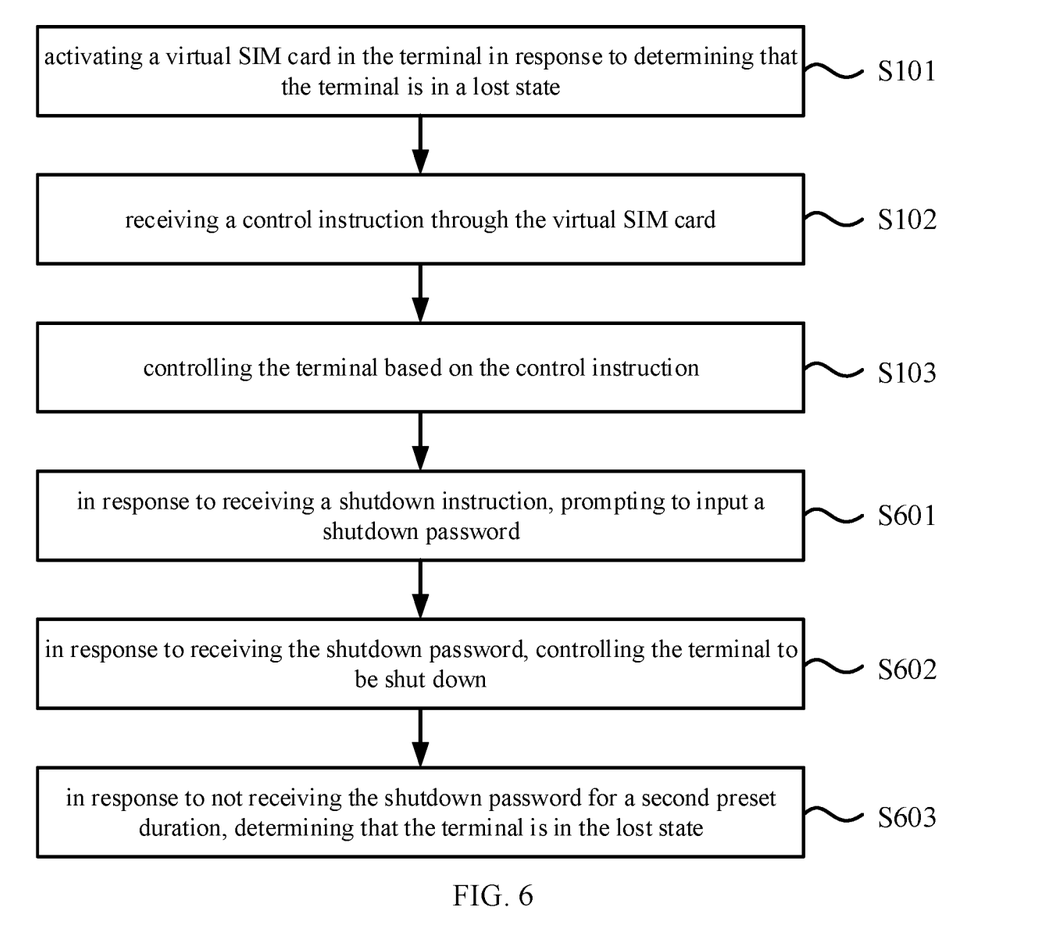
FIG. 6 is a flowchart illustrating yet another method for controlling a terminal in the embodiment of the disclosure.

FIG. 6 is a flowchart illustrating yet another method for controlling a terminal in the embodiment of the disclosure. As illustrated in FIG. 6, the method further includes: at S601, in response to receiving a shutdown instruction, inputting a shutdown password is prompted; at S602, in response to receiving the shutdown password, the terminal is controlled to be shut down; and at S603, in response to not receiving the shutdown password for a second preset duration, it is determined that the terminal is in the lost state.

In an embodiment, those who illegally occupy a terminal may shut down the terminal in order to prevent the owner from continuing controlling the terminal. No matter whether it is shut down by a physical key or by a virtual key or by other means such as voice, a shutdown instruction may be generated.

In the embodiment, when a terminal receives a shutdown instruction, inputting a shutdown password may be prompted, the shutdown password may be the same as or may be different from a verification identity password (for example, an unlocking password) normally used by the user to operate a terminal. When a correct shutdown password is not received within a long time, for example, a second preset duration, it may be determined that the terminal is in the lost state, and the terminal is controlled to be shut down only when receiving the correct shutdown password. Accordingly, it may be ensured that the terminal is more in a power-on state, so that the owner may find the terminal by controlling it.

Figure 7:
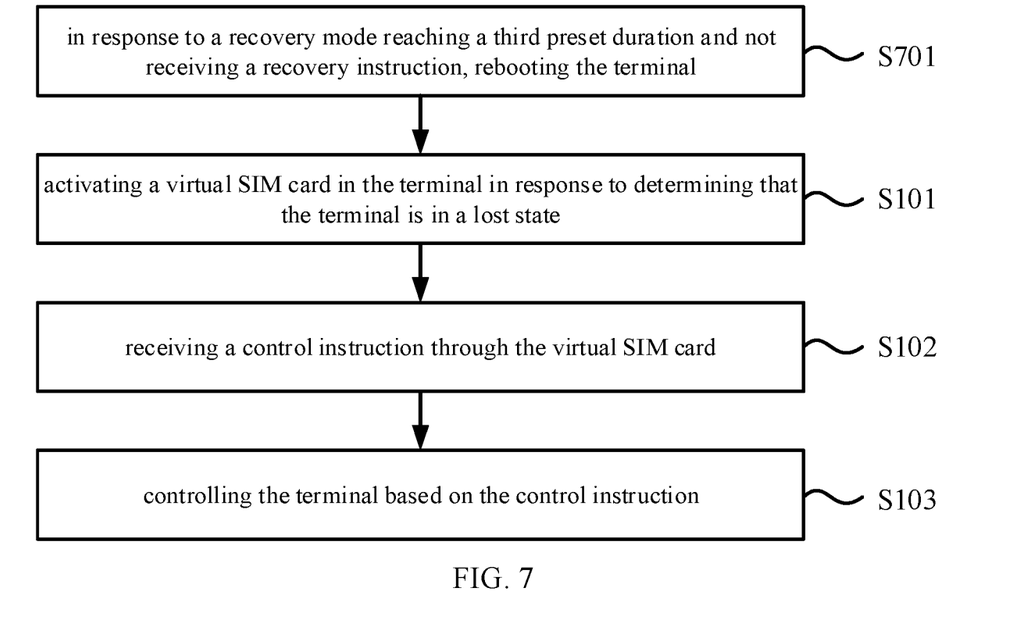
FIG. 7 is a flowchart illustrating yet another method for controlling a terminal in the embodiment of the disclosure.

FIG. 7 is a flowchart illustrating yet another method for controlling a terminal in the embodiment of the disclosure. As illustrated in FIG. 7, the method further includes: at S701, in response to a recovery mode reaching a third preset duration and not receiving a recovery instruction, the terminal is rebooted.

After the terminal accesses a recovery mode, the terminal may be maintained in the recovery mode where most functions of the terminal may not be used, in a mode where the terminal may not make communications similar to the shutdown. In this case, the owner may not send a control instruction to the terminal.

According to the embodiments of the disclosure, when the duration of the terminal in the recovery mode is relatively long, for example, reaches a third preset duration, and the terminal does not receive a recovery instruction yet, in which the recovery instruction includes an instruction generated by performing a recovery operation after plugging in a data cable (for example, a USB cable), the terminal may be automatically rebooted so that the terminal re-enters a state of being able to communication. Accordingly, the terminal may be prevented from being unable to communication for a long time, so that the owner may send a control instruction to the terminal in time.

For example, the recovery modes include but not limited to recovery, fastboot. For different recovery modes, the third preset durations may be different. For example, for a recovery mode, the third preset duration may be 2 minutes, and for a fastboot mode, the third preset duration may be 3 minutes.

In an embodiment, the control instruction includes at least one of the following: a positioning instruction, a locking instruction, a data clearing instruction, a sounding instruction, and a shooting instruction.

In an embodiment, the control instructions sent by the owner to the terminal may be various, and may be selected based on the requirement, and generally may be sent by a preset device. For example, after the service is logged in through a webpage, the control instructions may be sent by the server.

For example, in order to lock the terminal, a locking instruction may be sent to the terminal, and after receiving the locking instruction, the terminal is locked, for example, enters a first to-be-unlocked state or a second to-be-unlocked state.

For example, in order to find the terminal through the sound, or make those people around the terminal capable of noticing that the terminal is stolen or lost, a sound instruction may be sent to the terminal, and after receiving the sound instruction, the terminal may send a warning sound, and the volume of the warning sound may not be controlled by the instruction generated by the terminal itself, so as to maintain the maximum volume for output.

For example, in order to avoid data leakage, a data clearing instruction may be sent to the terminal, and after the terminal receives the data clearing instruction, all data may be cleared, or a specified type of data or data in a specified folder may be cleared.

In an embodiment, the control instruction includes a positioning instruction. The method includes: sending position information obtained by positioning the terminal to a preset device.

For example, in order to position the terminal, a positioning instruction may be sent to the terminal, and after receiving the positioning instruction, the terminal may determine its position information and send the position information to a preset device for view by the owner, so that the owner quickly determines a terminal position.

In an embodiment, the control instruction includes a shooting instruction. The method includes: sending a shooting result shot by a front camera and/or a rear camera of the terminal to a preset device.

For example, in order to shoot an environment and a person around the terminal, the terminal may send a shooting instruction to the terminal, and after receiving the shooting instruction, the terminal may shoot one or more images or shoot a video through the front camera or the rear camera, and send the shooting result to the preset device for view by the owner, so that the owner may determine a current holder of the terminal based on those people around the terminal, and also may determine a current position of the terminal based on the environment around the terminal.

Figure 8:
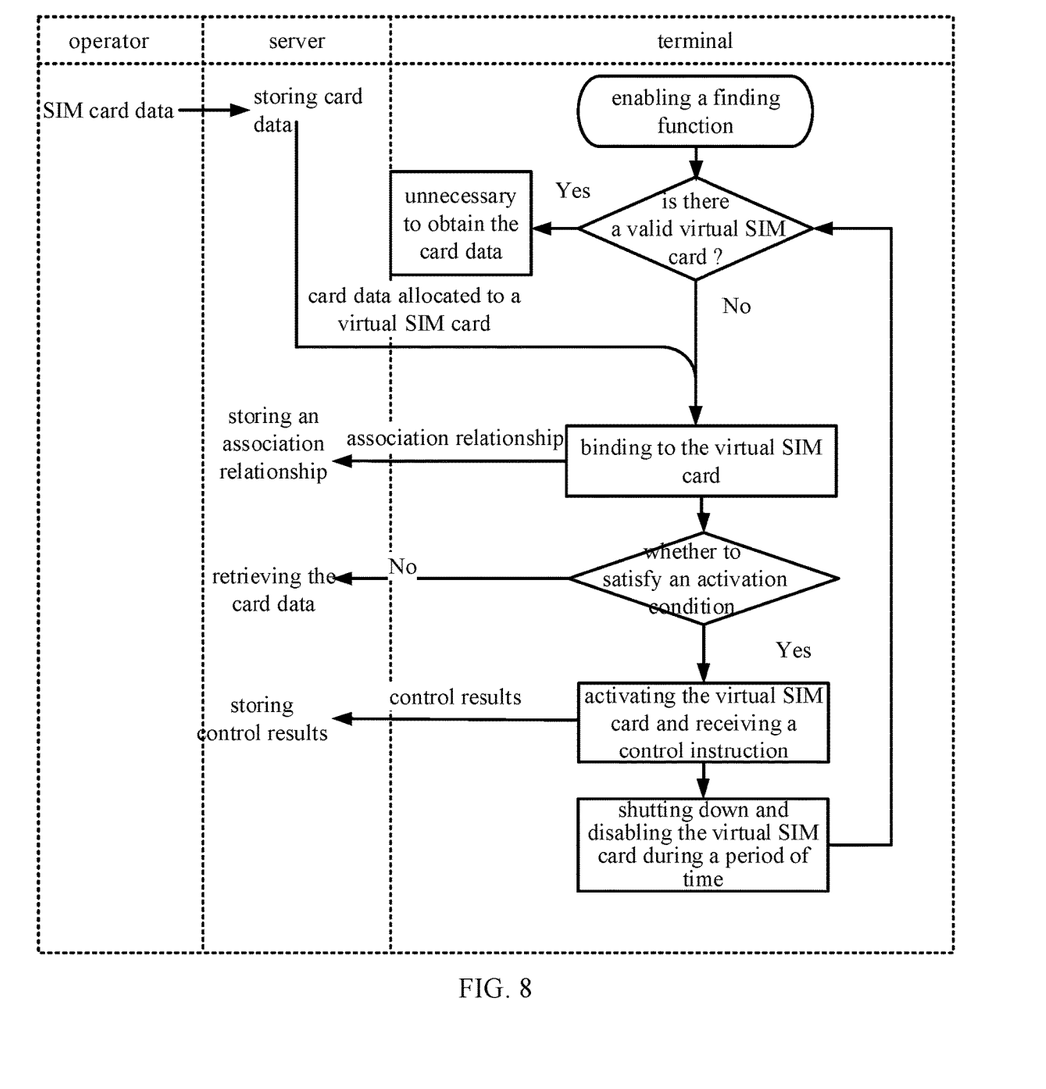
FIG. 8 is an interaction diagram illustrating another method for controlling a terminal in the embodiment of the disclosure.

FIG. 8 is an interaction diagram illustrating yet another method for controlling a terminal in the embodiment of the disclosure. As illustrated in FIG. 8, taking a preset device including a server as an example, the data of the virtual SIM card may be allocated to a terminal by a server, the server may be a local server or a cloud server.

First, an operator may provide card data of a batch of SIM cards as a card pool to a server, and the server may store the card data in a specified format, and allocate the card data to the terminal. For example, the terminal may register and request the card data on the server, and the server may allocate the card data to the terminal.

The terminal may prompt the owner whether to enable a finding function, and in response to enabling the finding function, the terminal may perform the steps in the foregoing embodiments. Further, it may be determined whether there is valid card data of a virtual SIM card inside the terminal itself. In response to determining that there is valid card data of the virtual SIM card, there may be no need to obtain the card data from the server, and in response to determining that there is no valid card data of the virtual SIM card, the card data may be obtained from the server, and an association relationship between the terminal and the virtual SIM card is notified to a server for storage and subsequent use by the server.

Furthermore, the terminal may determine whether a condition of activating the virtual SIM card during a period of time is satisfied, for example in the lost state. For example, the terminal may determine whether the condition of activating the virtual SIM card within 2 years starting from the current moment is satisfied, and if the condition of activating the virtual SIM card is not satisfied during the period of time, it indicates that the terminal is basically not lost, or the owner has changed the terminal and the server is informed that the server may retrieve the card data allocated to the terminal for reuse of other terminal, which accordingly avoids resource wastes.

However, if the condition of activating a virtual SIM card is satisfied during the period of time, the virtual SIM card may be activated, and a control instruction may be received based on the above embodiments. The terminal may be controlled to, such as position the terminal, perform shooting by a camera of the terminal, etc., then the positioning information and the shooting result may be sent to a server.

It should be noted that, for different communication types that a virtual SIM card needs, a corresponding directional traffic flow may be configured for the virtual SIM card. For example, in case that the virtual SIM card needs to receive a control instruction without performing a call operation, a data interaction service traffic flow may be configured for the virtual SIM card without configuring a traffic flow of other services such as a call service and a video service for the virtual SIM card, which is beneficial to saving resources.

After the virtual SIM card is activated for a period of time, for example, for one month, the virtual SIM card may be automatically shut down and set invalid, so as to avoid wasting resources due to occupying a virtual SIM card for a long time in case that the terminal cannot be found back. During the subsequent use process of the terminal, the above steps may also be continued to determine whether there is valid card data of the virtual SIM card in the terminal itself.

Corresponding to the embodiments of the method for controlling a terminal, the disclosure further provides embodiments of an apparatus for controlling a terminal.

The embodiments of the disclosure provide an apparatus for controlling a terminal. The terminal is provided with a SIM card, the terminal including but not limited to an electronic device such as a mobile phone, a tablet, a wearable device and a personal computer.

In an embodiment, the apparatus for controlling a terminal includes one or more processors, and the processor is configured to activate a virtual SIM card in the terminal in response to determining that the terminal is in a lost state; receive a control instruction through the virtual SIM card; and control the terminal based on the control instruction.

In an embodiment, the processor is further configured to: in response to receiving a loss indication sent by a preset device, determine that the terminal is in the lost state.

In an embodiment, the processor is further configured to: in response to a duration of the terminal in a to-be-unlocked state reaching a first preset duration, determine that the terminal is in the lost state.

In an embodiment, the processor is further configured to: in response to a physical SIM card of the terminal being pulled out, control the terminal to enter a first to-be-unlocked state.

In an embodiment, the processor is further configured to: in response to the terminal being recovered and rebooted, control the terminal to enter a second to-be-unlocked state.

In an embodiment, the card data of the virtual SIM card is stored in a bottom layer of the terminal, and/or storing and reading the card data of the virtual SIM card is supported by the bottom layer of the terminal.

In an embodiment, the processor is further configured to: in response to receiving a shutdown instruction, prompt to input a shutdown password; in response to receiving the shutdown password, control the terminal to be shut down; and in response to not receiving the shutdown password for a second preset duration, determine that the terminal is in the lost state.

In an embodiment, the processor is further configured to: in response to a recovery mode reaching a third preset duration and not receiving a recovery instruction, reboot the terminal.

In an embodiment, the control instruction includes at least one of the following: a positioning instruction, a locking instruction, a data clearing instruction, a sounding instruction, and a shooting instruction.

In an embodiment, the control instruction includes a positioning instruction. The processor is configured to: send position information obtained by positioning the terminal to a preset device.

In an embodiment, the control instruction includes a shooting instruction. The processor is configured to send a shooting result shot by a front camera and/or a rear camera of the terminal to a preset device.

With regard to the apparatus in the embodiments, the specific way in which each module performs an operation has been described in detail in the embodiments of the method, which will not be elaborated here.

Since the apparatus embodiments basically correspond to the method embodiments, please refer to part of descriptions of the method embodiments for relevant information. The above apparatus embodiments are merely exemplary, the modules described as separate components may or may not be physically separated, and components displayed as modules may or may not be physical modules, that is, may be located in one place, or may be distributed on a plurality of network modules. Some or all of the modules may be selected according to actual requirements to achieve the solutions in the embodiments. Those skilled in the art may understand and implement the method without any creative effort.

The embodiments of the disclosure further provide an electronic device, and includes: a processor; and a memory configured to store instructions executable by a processor;

the processor is configured to implement the method as described in the above any embodiment.

The embodiments of the disclosure further provide a computer readable storage medium stored with a computer program thereon, the program implements the blocks of the method as described in the any above embodiment when performed by a processor.

Figure 9:
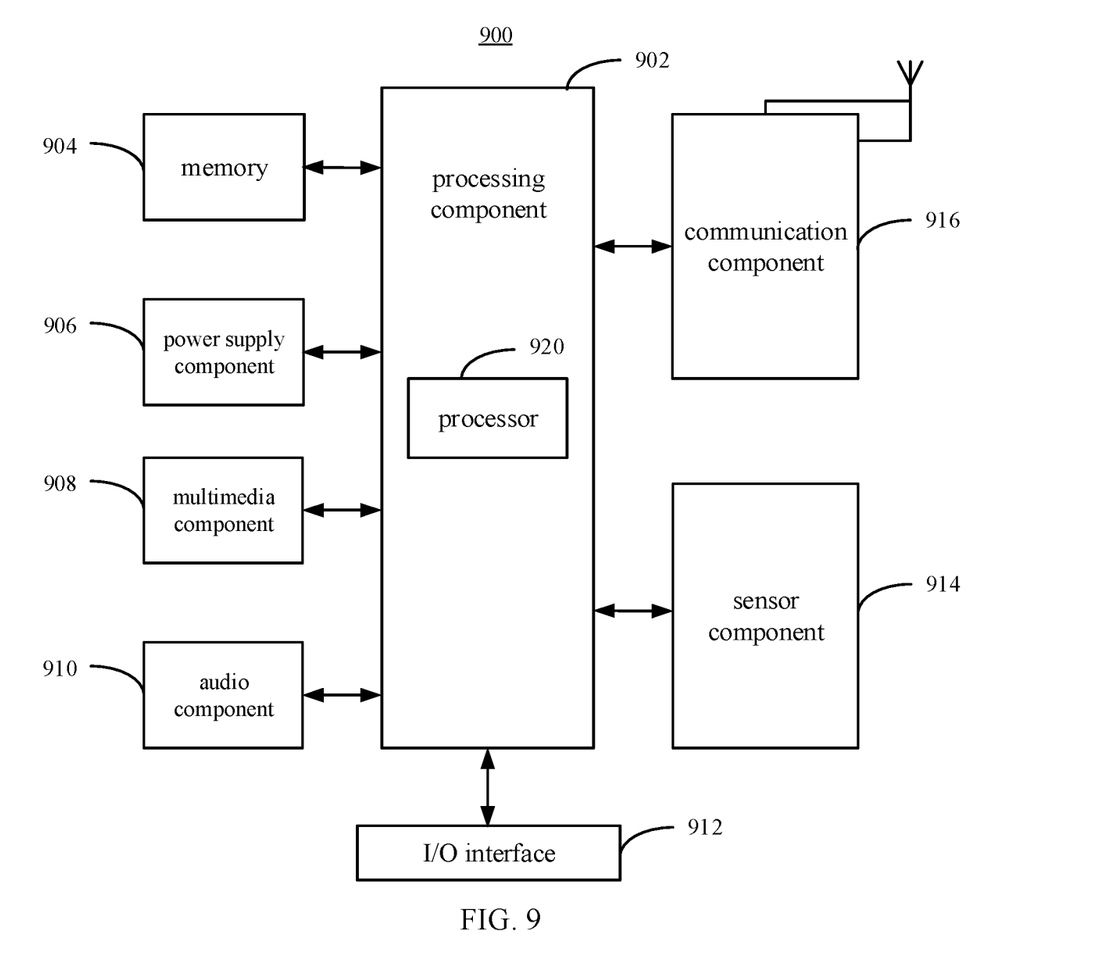
FIG. 9 is a block diagram illustrating a device for controlling a terminal in the embodiment of the disclosure.

FIG. 9 is a block diagram illustrating a device 900 for controlling a terminal in the embodiment of the disclosure. For example, the device 900 may be a mobile phone, a computer, a digital broadcasting terminal, a messaging device, a game console, a tablet device, a medical equipment, a fitness equipment, a personal digital assistant, etc.

As illustrated in FIG. 9, the device 900 may include one or more components: a processing component 902, a memory 904, a power supply component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For example, the processing component 902 may include a multimedia module for the convenience of interaction between the multimedia component 908 and the processing component 902.

The memory 904 is configured to store all types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 906 may provide power for all components of the device 900. The power supply component 906 may include power supply management system, one or more power supplies, and other units related to generating, managing and distributing power for the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface for the processing component 902 and the peripheral interface module, and the peripheral interface module may be a keyboard, a click wheel, a button, etc. The buttons may include but not limited to a home button, a volume button, a start button and a lock button.

The sensor component 914 includes one or more sensors to provide status assessments of various aspects of the device 900. For example, the sensor component 914 may detect the on/off state of the device 900 and the relative positioning of the component. For example, the component is a display and a keypad of the device 900. The sensor component 914 may further detect the position change of the device 900 or a component of the device 900, a presence or absence of contact between the user and the device 900, an orientation or acceleration/deceleration of the device 900, and the temperature change of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The apparatus 900 may access wireless networks based on a communication standard, such as WiFi, 2G or 3G, 4G LTE, 5G NR or their combination. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the device 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method as described in the above any embodiment.

In exemplary embodiments, there is also provided a non-transitory computer readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

After considering the specification and practicing the disclosure herein, those skilled in the art will be aware of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are described as examples, and the true scope of the disclosure are indicated by the following claims.

It should be understood that the present disclosure is not limited to the precise structure described above and shown in the drawings, and various modifications and changes may be made without departing from its scope. The scope of the present application is limited by the appended claims.

What is claimed is:

1. A method for controlling a terminal, comprising:
   activating a virtual subscriber identity module (SIM) card in the terminal in response to determining that the terminal is in a lost state;
   receiving a control instruction through the virtual SIM card; and
   controlling the terminal based on the control instruction;
   wherein the method further comprises: in response to a recovery mode of the terminal reaching a third preset duration and not receiving a recovery instruction, rebooting the terminal so that the terminal re-enters a state of being able to communication, wherein the recovery instruction is generated by performing a recovery operation after a data cable is plugged into an interface of the terminal.

2. The method of claim 1, further comprising:
   in response to receiving a loss indication sent by a preset device, determining that the terminal is in the lost state.

3. The method of claim 1, further comprising:
   in response to a duration of the terminal in a to-be-unlocked state reaching a first preset duration, determining that the terminal is in the lost state.

4. The method of claim 3, further comprising:
   in response to a physical SIM card of the terminal being pulled out, controlling the terminal to enter a first to-be-unlocked state for verifying an unlocking password of the terminal.

5. The method of claim 3, further comprising:
   in response to the terminal being recovered and rebooted, controlling the terminal to enter a second to-be-unlocked state for verifying an activating password of the terminal.

6. The method of claim 1, wherein data of the virtual SIM card is stored in a bottom layer of the terminal.

7. The method of claim 1, wherein storing and reading the data of the virtual SIM card is supported by a bottom layer of the terminal.

8. The method of claim 1, further comprising:
   in response to receiving a shutdown instruction, prompting to input a shutdown password;
   in response to receiving the shutdown password, controlling the terminal to be shut down; and
   in response to not receiving the shutdown password for a second preset duration, determining that the terminal is in the lost state.

9. A terminal, comprising:
   a processor; and
   a memory configured to store instructions executable by the processor;
   wherein, the processor is configured to:
   activate a virtual subscriber identity module (SIM) card in the terminal in response to determining that the terminal is in a lost state;
   receive a control instruction through the virtual SIM card; and
   control the terminal based on the control instruction;
   wherein the processor is further configured to in response to a recovery mode of the terminal reaching a third preset duration and not receiving a recovery instruction, reboot the terminal so that the terminal re-enters a state of being able to communication, wherein the recovery instruction is generated by performing a recovery operation after a data cable is plugged into an interface of the terminal.

10. The terminal of claim 9, wherein the processor is further configured to:
    in response to receiving a loss indication sent by a preset device, determine that the terminal is in the lost state.

11. The terminal of claim 9, wherein the processor is further configured to:
    in response to a duration of the terminal in a to-be-unlocked state reaching a first preset duration, determine that the terminal is in the lost state.

12. The terminal of claim 11, wherein the processor is further configured to:
    in response to a physical SIM card of the terminal being pulled out, control the terminal to enter a first to-be-unlocked state for verifying an unlocking password of the terminal.

13. The terminal of claim 11, wherein the processor is further configured to:
    in response to the terminal being recovered and rebooted, control the terminal to enter a second to-be-unlocked state for verifying an activating password of the terminal.

14. The terminal of claim 9, wherein the data of the virtual SIM card is stored in a bottom layer of the terminal.

15. The terminal of claim 9, wherein storing and reading the data of the virtual SIM card is supported by a bottom layer of the terminal.

16. The terminal of claim 9, wherein the processor is further configured to:
    in response to receiving a shutdown instruction, prompt to input a shutdown password;
    in response to receiving the shutdown password, control the terminal to be shut down; and
    in response to not receiving the shutdown password for a second preset duration, determine that the terminal is in the lost state.

17. A non-transitory computer readable storage medium having a computer program stored thereon, wherein when the computer program is performed by a processor, a method for controlling a terminal is carried out, the method comprising:
    activating a virtual subscriber identity module (SIM) card in the terminal in response to determining that the terminal is in a lost state;
    receiving a control instruction through the virtual SIM card; and
    controlling the terminal based on the control instruction;
    wherein the method further comprises: in response to a recovery mode of the terminal reaching a third preset duration and not receiving a recovery instruction, rebooting the terminal so that the terminal re-enters a state of being able to communication, wherein the recovery instruction is generated by performing a recovery operation after a data cable is plugged into an interface of the terminal.

18. The storage medium of claim 17, further comprising:
in response to receiving a loss indication sent by a preset device, determining that the terminal is in the lost state.

* * * * *